US011347246B2

(12) United States Patent
Goodjohn et al.

(10) Patent No.: US 11,347,246 B2
(45) Date of Patent: May 31, 2022

(54) WATER HEATER APPLIANCES AND METHODS FOR CONTROLLING A MIXING VALVE WITH A PARK PERIOD

(71) Applicant: Haier US Appliance Solutions, Inc., Wilmington, DE (US)

(72) Inventors: Paul Goodjohn, Crestwood, KY (US); Craig Iung-Pei Tsai, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/925,493

(22) Filed: Jul. 10, 2020

(65) Prior Publication Data
US 2022/0011792 A1 Jan. 13, 2022

(51) Int. Cl.
*G05D 23/13* (2006.01)
*F24H 9/20* (2022.01)
*F24H 9/13* (2022.01)
*F24D 19/10* (2006.01)

(52) U.S. Cl.
CPC .......... *G05D 23/134* (2013.01); *F24H 9/133* (2022.01); *F24H 9/2021* (2013.01); *G05D 23/1393* (2013.01); *F24D 19/1051* (2013.01); *Y10T 137/6497* (2015.04)

(58) Field of Classification Search
CPC .................. G05D 23/134; G05D 23/1393; F24H 9/2021; Y10T 137/2574
See application file for complete search history.

(56) References Cited

U.S. PATENT DOCUMENTS

| 5,867,384 A | 2/1999 | Nebil | |
| 9,234,679 B2 | 1/2016 | Sivaprasad | |
| 2002/0153425 A1* | 10/2002 | Mountford | G05D 23/1393 236/12.12 |
| 2014/0026970 A1* | 1/2014 | DuPlessis | F24H 9/2021 137/3 |
| 2015/0013622 A1* | 1/2015 | Farris | G05D 23/1366 122/14.1 |

(Continued)

FOREIGN PATENT DOCUMENTS

| JP | 2003083614 A * | 3/2003 |
| JP | 4674540 B2 | 4/2011 |

(Continued)

*Primary Examiner* — Nathaniel Herzfeld
(74) *Attorney, Agent, or Firm* — Dority & Manning, P.A.

(57) ABSTRACT

A water heater appliance and methods for operating the same, as provided herein, may include a casing, a tank, an inlet conduit, an electric heating system, a mixing valve, and a controller. The electric heating system may be in thermal communication with the tank. The mixing valve may be mounted to the casing downstream from the tank. The controller may be operably coupled to the electric heating system and the mixing valve. The controller may be configured to initiate a mixing cycle. The mixing cycle may include detecting a flow demand at the water heater appliance, directing the mixing valve to a programmed park position in response to detecting the flow demand, determining expiration of a park period following directing the mixing valve to the programmed park position, and releasing the mixing valve from the programmed park position in response to determining expiration of the park period.

20 Claims, 7 Drawing Sheets

(56) References Cited

U.S. PATENT DOCUMENTS

| | | | | |
|---|---|---|---|---|
| 2016/0313029 A1* | 10/2016 | Ward | ................. | G05D 23/1393 |
| 2016/0377322 A1* | 12/2016 | Ward | ................. | G05D 23/1393 |
| | | | | 122/14.3 |
| 2017/0122458 A1* | 5/2017 | Farris | ................. | G05D 23/1393 |
| 2018/0163993 A1 | 6/2018 | Goodjohn | | |

FOREIGN PATENT DOCUMENTS

| | | | | |
|---|---|---|---|---|
| JP | 2015190735 A | * | 11/2015 | |
| JP | 2017122541 A | * | 7/2017 | |

* cited by examiner

WATER HEATER APPLIANCES AND METHODS FOR CONTROLLING A MIXING VALVE WITH A PARK PERIOD

FIELD OF THE INVENTION

The present subject matter relates generally to water heater appliances, and more particularly to methods and features for mixing water from a water heater appliance.

BACKGROUND OF THE INVENTION

Water heater appliances (i.e., water heaters) are used for storing or supplying hot water to residential and commercial properties. A typical residential water heater holds about fifty gallons of water inside a steel reservoir tank. Heating elements, such as gas burners, electric resistance elements, or sealed systems, heat water within the tank during operation of such water heater appliances. In particular, the heating elements generally heat water within the tank to a predetermined temperature (e.g., as set by a thermostat). Many water heaters permit a consumer to set the thermostat to a temperature between 90 and 150 degrees Fahrenheit (F) (32 to 65 degrees Celsius (C)).

During operation, relatively cool water flows into the tank, and the heating elements operate to heat such water to the predetermined temperature. Thus, the volume of heated water available at the predetermined temperature is generally limited to the volume of the tank. According, water heater appliances are sold in various sizes to permit consumers to select a proper tank volume and provide sufficient heated water. However, large water heater appliances with large tanks occupy large amount of space within a residence or business. In certain buildings, space is limited or expensive. Thus, using large water heater appliances can be impractical or prohibitively expensive despite needing large volumes of heated water.

To provide relatively large volumes of heated water from relatively small tanks, certain water heater appliances use a mixing valve. The mixing valve permits water within the water heater's tank to be stored at relatively high temperatures. The mixing valve mixes such high temperature water with relatively cool water in order to bring the temperature of such water down to a suitable or more usable set-point temperature. Thus, such water heater appliance can provide relatively large volumes of heated water without requiring large tanks. Nonetheless, challenges exist with typical mixing valve configurations. For instance, typical water heater appliances operate the mixing valve according to a feedback loop, such as a proportional-integral-derivative (PID) control scheme, which can create a lag or slug of water that does not meet a set-point temperature following an extended period of non-use. This often results in wasted water or an unsatisfactory user experience.

As a result, improved water heater appliances addressing one or more of the above-identified issues would be useful. In particular, it would be advantageous to provide a water heater appliance or method for improving the mixing of water through or from a mixing valve (e.g., following a period of non-use). Additionally or alternatively, it would be advantageous the time needed for a mixed water flow from a water heater appliance to a predetermined temperature.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a water heater appliance is provided. The method may include detecting a flow demand at the water heater appliance. The method may further include directing a mixing valve to a programmed park position in response to detecting the flow demand. The method may still further include determining expiration of a park period following directing the mixing valve to the programmed park position. The method may also include releasing the mixing valve from the programmed park position in response to determining expiration of the park period.

In another exemplary aspect of the present disclosure, a water heater appliance is provided. The water heater appliance may include a casing, a tank, an inlet conduit, an electric heating system, a mixing valve, and a controller. The tank may be disposed within the casing. The tank may define an inlet and an outlet. The inlet conduit may be mounted to the tank at the inlet of the tank. The electric heating system may be in thermal communication with the tank to heat water within the tank. The mixing valve may be mounted to the casing downstream from the tank. The controller may be operably coupled to the electric heating system and the mixing valve. The controller may be configured to initiate a mixing cycle. The mixing cycle may include detecting a flow demand at the water heater appliance, directing the mixing valve to a programmed park position in response to detecting the flow demand, determining expiration of a park period following directing the mixing valve to the programmed park position, and releasing the mixing valve from the programmed park position in response to determining expiration of the park period.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 1:
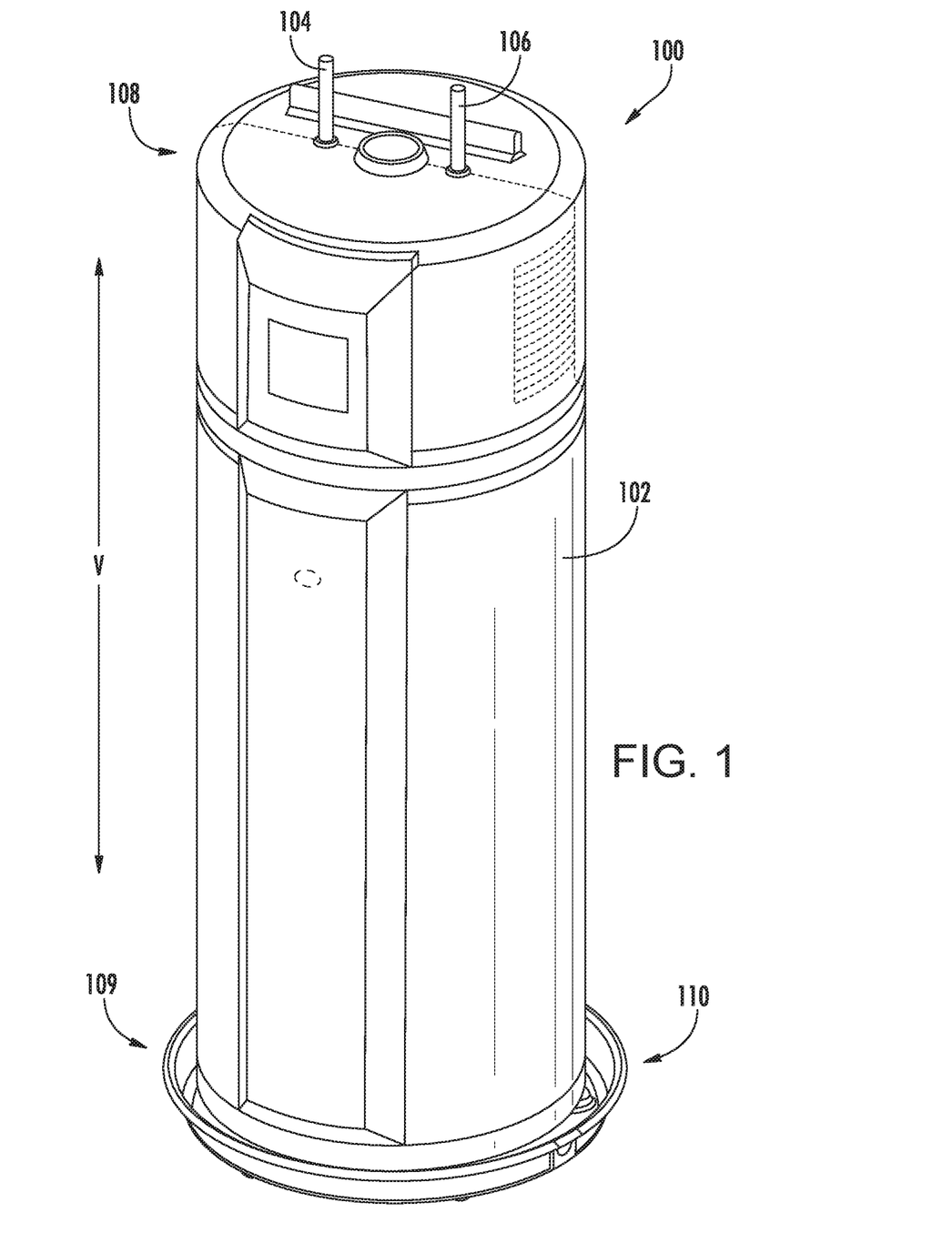
FIG. 1 provides a perspective view of a water heater appliance according to an exemplary embodiment of the present disclosure.
Figure 2:
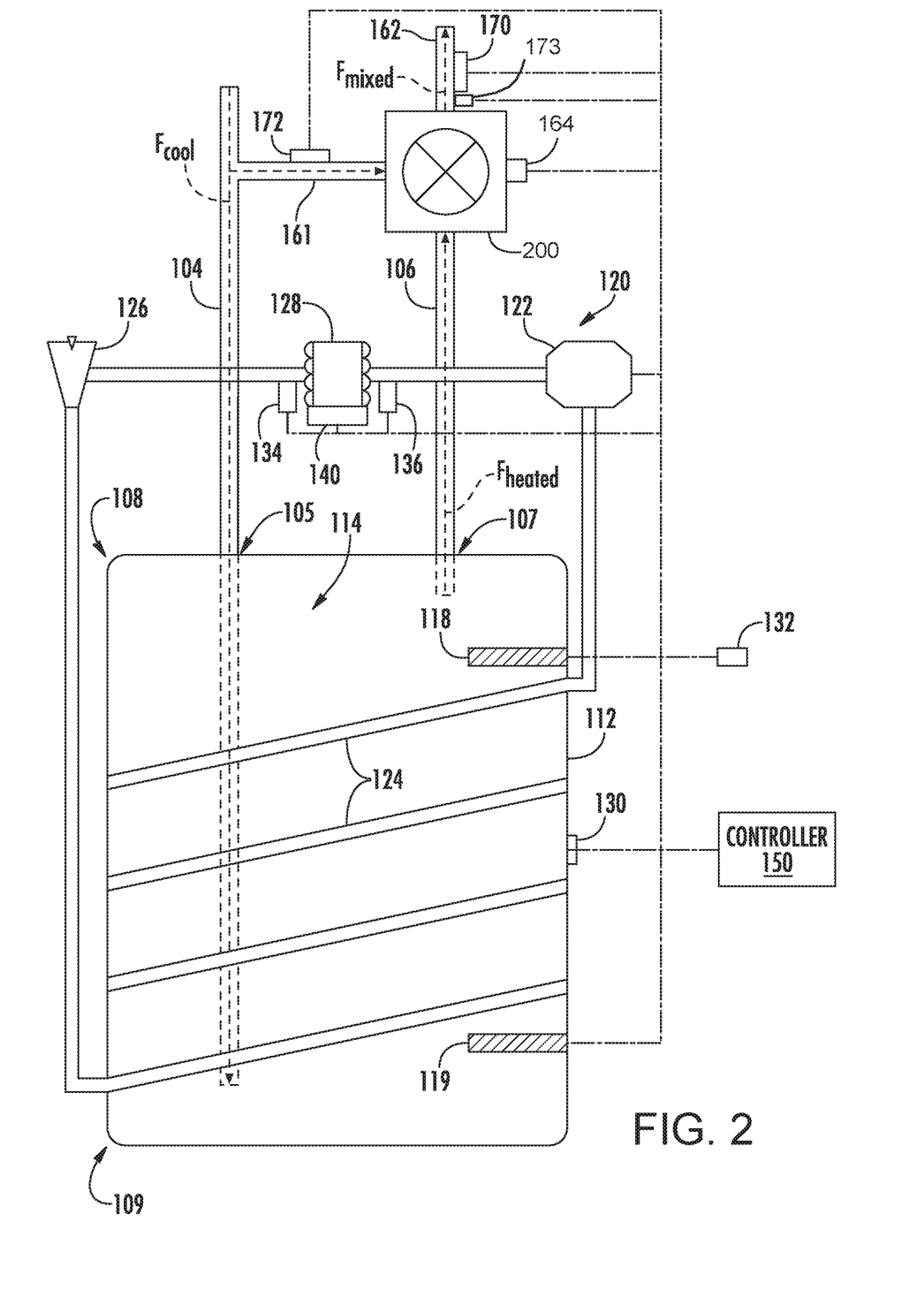
FIG. 2 provides a schematic view of certain components of the exemplary water heater appliance of FIG. 1.

FIG. 1 provides a perspective view of a water heater appliance 100 according to exemplary embodiments of the present disclosure. FIG. 2 provides a schematic view of certain components of water heater appliance 100. As may be seen in FIGS. 1 and 2, water heater appliance 100 includes a casing 102 and a tank 112 mounted within casing 102. Tank 112 defines an interior volume 114 for heating water therein.

Water heater appliance 100 may include an inlet conduit 104 and an outlet conduit 106 that are both in fluid communication with tank 112 within casing 102. As an example, cold water from a water source (e.g., a municipal water supply or a well) enters water heater appliance 100 through inlet conduit 104. From inlet conduit 104, such cold water enters interior volume 114 of tank 112 wherein the water is heated to generate heated water. Such heated water exits water heater appliance 100 at outlet conduit 106 and, for example, is supplied to a bath, shower, sink, or any other suitable feature.

As may be seen in FIG. 1, water heater appliance 100 extends between a top portion 108 and a bottom portion 109 along a vertical direction V. Thus, water heater appliance 100 is generally vertically oriented. Water heater appliance 100 can be leveled (e.g., such that casing 102 is plumb in the vertical direction V) in order to facilitate proper operation of water heater appliance 100.

A drain pan 110 is positioned at bottom portion 109 of water heater appliance 100 such that water heater appliance 100 sits on drain pan 110. Drain pan 110 sits beneath water heater appliance 100 along the vertical direction V (e.g., to collect water that leaks from water heater appliance 100 or water that condenses on an evaporator 128 of water heater appliance 100). It should be understood that water heater appliance 100 is provided by way of example only and that the present disclosure may be used with any suitable water heater appliance.

Turning now to FIG. 2, water heater appliance 100 may include an upper heating element 118, a lower heating element 119, or a sealed system 120 for heating water within interior volume 114 of tank 112. Thus, water heater appliance 100 may be commonly referred to as a "heat pump water heater appliance." Upper and lower heating elements 118 and 119 can be any suitable heating elements. For example, upper heating element 118 or lower heating element 119 may be an electric resistance element, a microwave element, an induction element, or any other suitable heating element or combination thereof. Additionally or alternatively, lower heating element 119 may be a gas burner.

Sealed system 120 generally includes a compressor 122, a condenser 124, a throttling device 126, and an evaporator 128. Condenser 124 is thermally coupled or assembled in a heat exchange relationship with tank 112 in order to heat water within interior volume 114 of tank 112 during operation of sealed system 120. For instance, condenser 124 may be a conduit coiled around and mounted to tank 112. During operation of sealed system 120, refrigerant exits evaporator 128 as a fluid in the form of a superheated vapor or high quality vapor mixture. Upon exiting evaporator 128, the refrigerant enters compressor 122 wherein the pressure and temperature of the refrigerant are increased such that the refrigerant becomes a superheated vapor. The superheated vapor from compressor 122 enters condenser 124 wherein it transfers energy to the water within tank 112 and condenses into a saturated liquid or high quality liquid vapor mixture. This high quality/saturated liquid vapor mixture exits condenser 124 and travels through throttling device 126 that is configured for regulating a flow rate of refrigerant therethrough. Upon exiting throttling device 126, the pressure and temperature of the refrigerant drop at which time the refrigerant enters evaporator 128 and the cycle repeats itself. In certain exemplary embodiments, throttling device 126 may be an electronic expansion valve (EEV).

A fan or air handler 140 may assist with heat transfer between air about water heater appliance 100 (e.g., within casing 102) and refrigerant within evaporator 128. Air handler 140 may be positioned within casing 102 on or adjacent to evaporator 128. Thus, when activated, air handler 140 may direct a flow of air towards or across evaporator 128, and the flow of air from air handler 140 may assist with heating refrigerant within evaporator 128. Air handler 140 may be any suitable type of air handler, such as an axial or centrifugal fan.

In some embodiments, water heater appliance 100 includes a tank temperature sensor 130. Tank temperature sensor 130 may be configured for measuring a temperature of water within interior volume 114 of tank 112. Tank temperature sensor 130 can be positioned at any suitable location within or on water heater appliance 100. For instance, tank temperature sensor 130 may be positioned within interior volume 114 of tank 112 or may be mounted to tank 112 outside of interior volume 114 of tank 112. When mounted to tank 112 outside of interior volume 114 of tank 112, tank temperature sensor 130 can be configured for indirectly measuring the temperature of water within interior volume 114 of tank 112. For example, tank temperature sensor 130 can measure the temperature of tank 112 and correlate the temperature of tank 112 to the temperature of water within interior volume 114 of tank 112. Tank temperature sensor 130 may also be positioned at or adjacent top portion 108 of water heater appliance 100 (e.g., at or adjacent to an inlet of outlet conduit 106).

Tank temperature sensor 130 can be any suitable temperature sensor. For example, tank temperature sensor 130 may be a thermocouple or a thermistor. As may be seen in FIG. 2, tank temperature sensor 130 may be the only temperature sensor positioned at or on tank 112 that is configured for measuring the temperature of water within interior volume 114 of tank 112 in certain exemplary embodiments. In further exemplary embodiments, additional temperature sensors may be positioned at or on tank 112 to assist tank temperature sensor 130 with measuring the temperature of water within interior volume 114 of tank 112 (e.g., at other locations within interior volume 114 of tank 112).

In certain embodiments, water heater appliance 100 includes an ambient temperature sensor 132, an evaporator inlet temperature sensor 134, or an evaporator outlet temperature sensor 136. Ambient temperature sensor 132 may be configured for measuring a temperature of air about water heater appliance 100. Ambient temperature sensor 132 can be positioned at any suitable location within or on water heater appliance 100. For instance, ambient temperature sensor 132 may be mounted to casing 102 (e.g., at or adjacent to top portion 108 of water heater appliance 100). Ambient temperature sensor 132 can be any suitable temperature sensor. For example, ambient temperature sensor 132 may be a thermocouple or a thermistor.

Evaporator inlet temperature sensor 134 may be configured for measuring a temperature of refrigerant at or adjacent to an inlet of evaporator 128. Thus, evaporator inlet temperature sensor 134 may be positioned at or adjacent to an inlet of evaporator 128, as shown in FIG. 2. For example, evaporator inlet temperature sensor 134 may be mounted to tubing that directs refrigerant into evaporator 128 (e.g., at or adjacent to an inlet of evaporator 128). When mounted to tubing, evaporator inlet temperature sensor 134 can be configured for indirectly measuring the temperature of refrigerant at inlet of evaporator 128. For example, evaporator inlet temperature sensor 134 can measure the temperature of the tubing and correlate the temperature of the tubing to the temperature of refrigerant at inlet of evaporator 128. Evaporator inlet temperature sensor 134 can be any suitable temperature sensor. For example, evaporator inlet temperature sensor 134 may be a thermocouple or a thermistor.

Evaporator outlet temperature sensor 136 is configured for measuring a temperature of refrigerant at or adjacent to an outlet of evaporator 128. Thus, evaporator outlet temperature sensor 136 may be positioned at or adjacent to an outlet of evaporator 128, as shown in FIG. 2. For example, evaporator outlet temperature sensor 136 may be mounted to tubing that directs refrigerant out of evaporator 128 (e.g., at or adjacent to an outlet of evaporator 128). When mounted to tubing, evaporator outlet temperature sensor 136 can be configured for indirectly measuring the temperature of refrigerant at outlet of evaporator 128. For example, evaporator outlet temperature sensor 136 can measure the temperature of the tubing and correlate the temperature of the tubing to the temperature of refrigerant at outlet of evaporator 128. Evaporator outlet temperature sensor 136 can be any suitable temperature sensor. For example, evaporator outlet temperature sensor 136 may be a thermocouple or a thermistor.

Water heater appliance 100 includes a controller 150 that may be configured for regulating operation of water heater appliance 100. In certain embodiments, controller 150 is in operative communication (e.g., direct electrical communication, indirect electrical communication, wireless communication, etc.) with upper heating element 118, lower heating element 119, compressor 122, tank temperature sensor 130, ambient temperature sensor 132, evaporator inlet temperature sensor 134, evaporator outlet temperature sensor 136, or air handler 140. Thus, controller 150 may selectively activate upper and lower heating elements 118 and 119 or compressor 122 in order to heat water within interior volume 114 of tank 112 (e.g., in response to signals from tank temperature sensor 130, ambient temperature sensor 132, evaporator inlet temperature sensor 134, or evaporator outlet temperature sensor 136). Moreover, controller 150 may initiate one or more heating or mixing cycles (e.g., method 700—FIG. 7) to control operation of water heater appliance 100.

In some embodiments, controller 150 includes memory (e.g., non-transitive memory) and one or more processing devices (e.g., microprocessors, CPUs or the like), such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

During activation of water heater appliance 100, controller 150 may generally operate upper heating element 118, lower heating element 119 or compressor 122 in order to heat water within interior volume 114 of tank 112. As an example, a user may select or establish a set temperature, $t_s$, for water within interior volume 114 of tank 112, or the set temperature $t_s$ for water within interior volume 114 of tank 112 may be a default value. Based upon the set temperature $t_s$ for water within interior volume 114 of tank 112, controller 150 may selectively activate upper heating element 118, lower heating element 119, or compressor 122 in order to heat water within interior volume 114 of tank 112 to the set temperature $t_s$ for water within interior volume 114 of tank 112. Additionally or alternatively, the set temperature $t_s$ for water within interior volume 114 of tank 112 may be a default value. Based upon the set temperature $t_s$ for water within interior volume 114 of tank 112, controller 150 may selectively activate upper heating element 118, lower heating element 119, or compressor 122. For instance, a temperature range may be provided for the set temperature $t_s$. In other words, a range may be provided that includes a set temperature minimum $t_{smin}$ and a set temperature maximum $t_{smax}$ that is below and above, respectively, the set temperature $t_s$. If the water within interior volume 114 of tank 112 falls below the set temperature minimum $t_{smin}$, upper heating element 118, lower heating element 119, or compressor 122 may be activated to heat the water. If the water within interior volume 114 of tank 112 rises above the set temperature maximum $t_{smax}$, upper heating element 118, lower heating element 119, or compressor 122 may be deactivated to stop heating the water.

The set temperature $t_s$ for water within interior volume 114 of tank 112 may be any suitable temperature. For example, the set temperature $t_s$ for water within interior volume 114 of tank 112 may be a value between 90 and 150 degrees Fahrenheit (F) (32 to 65 degrees Celsius (C)). To prevent scalding and to save energy, consumers may set the thermostat to heat the water within the interior volume 114 to a temperature in a range between 120 degrees F. to 140 degrees F. (about 49 degrees C. to 60 degrees C.).

As may be seen in FIG. 2, in some embodiments, water heater appliance 100 includes a mixing valve 200 (e.g., upstream from a mixed water outlet conduit 162). Generally, mixing valve 200 is in fluid communication with inlet conduit 104 via a bypass conduit 161, outlet conduit 106, and mixed water outlet conduit 162. As discussed in greater detail below, mixing valve 200 is configured for selectively directing water from inlet conduit 104 and outlet conduit 106 into mixed water outlet conduit 162 in order to regulate a temperature of water within mixed water outlet conduit 162. Mixing valve 200 may be positioned or disposed within casing 102 of water heater appliance 100 (e.g., such that mixing valve 200 is integrated within water heater appliance 100).

As an example, mixing valve 200 can selectively adjust between a first position and a second position (e.g., including a plurality of positions first and second positions). In the first position, mixing valve 200 can permit a first flow rate of relatively cool water from inlet conduit 104 (shown schematically with arrow labeled $F_{cool}$ in FIG. 2) into mixed water outlet conduit 162 and mixing valve 200 can also permit a first flow rate of relatively hot water from outlet conduit 106 (shown schematically with arrow labeled $F_{heated}$ in FIG. 2) into mixed water outlet conduit 162. In such a manner, water within mixed water outlet conduit 162 (shown schematically with arrow labeled $F_{mixed}$ in FIG. 2) can have a first particular temperature when mixing valve 200 is in the first position. Similarly, mixing valve 200 can permit a second flow rate of relatively cool water from inlet conduit 104 into mixed water outlet conduit 162 and mixing valve 200 can also permit a second flow rate of relatively hot water from outlet conduit 106 into mixed water outlet conduit 162 in the second position. The first and second flow rates of the relatively cool water and relatively hot water are different such that water within mixed water outlet conduit 162 can have a second particular temperature when mixing valve 200 is in the second position. In such a manner, mixing valve 200 can regulate the temperature of water within mixed water outlet conduit 162 and adjust the temperature of water within mixed water outlet conduit 162 between the first and second particular temperatures.

It should be understood that, in certain exemplary embodiments, mixing valve 200 is adjustable between more positions than the first and second positions. In particular, mixing valve 200 may be adjustable between any suitable number of positions in alternative exemplary embodiments. As an example, mixing valve 200 may be infinitely adjustable in order to permit infinite fine-tuning of the temperature of water within mixed water outlet conduit 162. As an additional or alternative example, mixing valve may be adjustable between a plurality of discrete positions in order to permit a predetermined set of adjustments to the temperature of water within mixed water outlet conduit 162.

Water heater appliance 100 may include a position sensor 164. Position sensor 164 may be configured for determining a position of mixing valve 200. Position sensor 164 can monitor the position of mixing valve 200 in order to assist with regulating the temperature of water within mixed water outlet conduit 162. For example, position sensor 164 can determine when mixing valve 200 is in the first position or the second position (or another position) in order to ensure that mixing valve 200 is properly or suitably positioned depending upon the temperature of water within mixed water outlet conduit 162 desired or selected. Thus, position sensor 164 can provide feedback regarding the status or position of mixing valve 200.

Position sensor 164 may be any suitable type of sensor. For example, position sensor 164 may be a physical sensor, such as an optical sensor, Hall-effect sensor, etc. In alternative exemplary embodiments, controller 150 may determine or measure a motor position of mixing valve 200 based on a previously commanded position of mixing valve 200. Thus, controller 150 may determine that the current position of mixing valve 200 corresponds to a latest position that controller 150 commanded for mixing valve 200 in a previous iteration.

In some embodiments, water heater appliance 100 includes a mixed water conduit (e.g., first) temperature sensor 170 or an inlet conduit (e.g., second) temperature sensor 172. First temperature sensor 170 may be positioned downstream of mixing valve 200. For instance, first temperature sensor 170 may be positioned on or proximate mixed water outlet conduit 162 and configured for measuring a temperature of water within mixed water outlet conduit 162. Second temperature sensor 172 may be positioned upstream of mixing valve 200. For instance, second temperature sensor 172 is positioned on or proximate to inlet conduit 104 or bypass conduit 161 and may be configured for measuring a temperature of water within inlet conduit 104 or bypass conduit 161. In exemplary embodiments, first temperature sensor 170 or second temperature sensor 172 is positioned proximate or adjacent to mixing valve 200. First and second temperature sensors 170, 172 may be any suitable type of temperature sensors, such as a thermistor or thermocouple.

In optional embodiments, a water flow sensor 173 is mounted in fluid communication mixing valve 200. For instance, water flow sensor 173 may be mounted downstream from mixing valve 200 and configured for measuring the active flow (e.g., as a volumetric flowrate or velocity) of water from water heater appliance 100. Moreover, water flow sensor 173 may be in operative communication with controller 150 (e.g., to transmit a flow measurement or signal thereto). Water flow sensor 173 may be any suitable flow sensor, such as a rotameter sensor, Venturi sensor, ultrasonic sensor, etc. Additionally or alternatively, controller 150 may be configured to measure a flow rate of water from water heater appliance 150 absent any dedicated sensor, as would be understood.

In some embodiments, controller 150 can operate mixing valve 200 to regulate the temperature of water within mixed water outlet conduit 162 (e.g., according to a mixing cycle). For instance, controller 150 can adjust the position of mixing valve 200 in order to regulate the temperature of water within mixed water outlet conduit 162 [e.g., based, at least in part, on the set-point temperature of mixing valve 200, such as according to a proportional-integral-derivative (PID) control scheme]. As an example, a user can select or establish a set-point temperature of mixing valve 200, or the set-point temperature of mixing valve 200 may be a default value. Under certain conditions or instances controller 150 can adjust the position of mixing valve 200 in order to change or tweak a ratio of relatively cool water flowing into mixed water outlet conduit 162 from inlet conduit 104 and relatively hot water flowing into mixed water outlet conduit 162 from outlet conduit 106. Under some conditions, such as when water flow is started following a period of stasis (e.g., without a flow of water from water heater appliance 200), adjustments to the position of the mixing valve 200 may be based on a programmed park position. Under other conditions, such as when the water flow is well-established, adjustments to the position of the mixing valve 200 may be based upon the temperature measurements made, for instance, at one or more of the temperature sensors 170, 172. For instance, a PID control scheme may be programmed within controller 150 to adjust the position of mixing valve 200 such that the temperature of water within mixed water outlet conduit 162 matches the set-point temperature. In such a manner, controller 150 can regulate the temperature of water within mixed water outlet conduit 162.

The set-point temperature of mixing valve 200 can be any suitable temperature. For example, the set temperature is for water within interior volume 114 of tank 112 may be a value between 90 and 120 degrees F. to 140 degrees F. (about 49 degrees C. to 60 degrees C.). In particular, the set-point temperature of mixing valve 200 may be selected such that the set-point temperature of mixing valve 200 is less than the set temperature for water within interior volume 114 of tank 112. In such a manner, mixing valve 200 can use water from inlet conduit 104 and outlet conduit 106 to regulate the temperature of water within mixed water outlet conduit 162.

Figure 3:
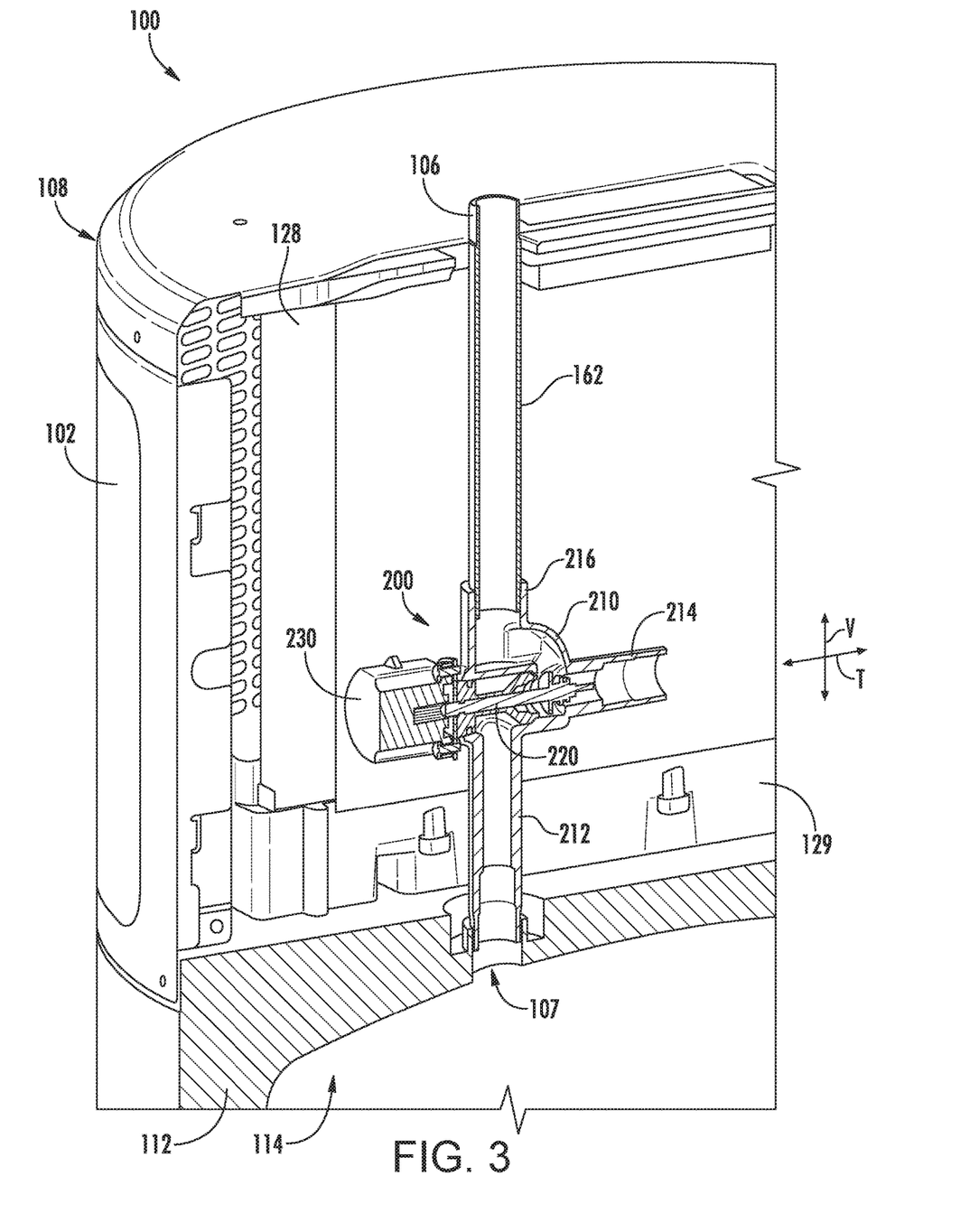
FIG. 3 provides a partial, section view of the exemplary water heater appliance of FIG. 1.
Figure 4:
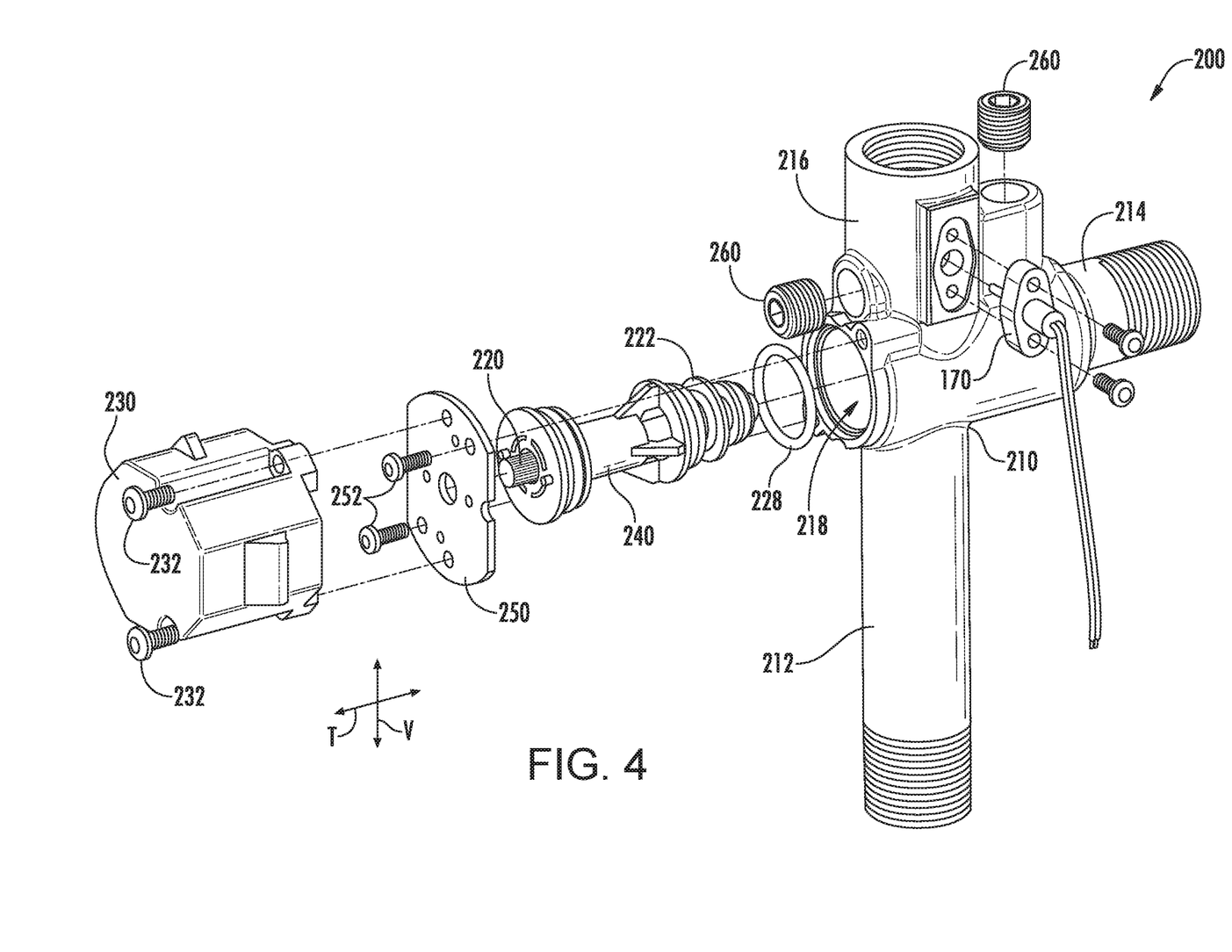
FIG. 4 provides an exploded view of a mixing valve of the exemplary water heater appliance of FIG. 1.

FIG. 3 provides a partial, section view of water heater appliance 100 at top portion 108 of water heater appliance 100. FIG. 4 provides an exploded view of mixing valve 200 of water heater appliance 100. It should be understood that, while described in greater detail below, any suitable mixing valve may be used in accordance with the present disclosure.

As may be seen in FIGS. 3 and 4, mixing valve 200 generally includes a valve body 210. Valve body 210 has a heated water conduit 212, a cold water conduit 214, a mixed water conduit 216 and a mixing chamber 218. As may be seen in FIG. 3, heated water conduit 212 of valve body 210 is coupled to tank 112 at an outlet 107 of tank 112. As an example, heated water conduit 212 of valve body 210 may be threaded to tank 112 at outlet 107 of tank 112 such that heated water conduit 212 of valve body 210 forms at least a portion of outlet conduit 106. Bypass conduit 161 is coupled to cold water conduit 214 of valve body 210. Accordingly, heated water from interior volume 114 of tank 112 may flow into mixing chamber 218 of valve body 210 via heated water conduit 212 of valve body 210, and cold water from inlet conduit 104 may flow into mixing chamber 218 of valve body 210 via cold water conduit 214 of valve body 210.

Heated water conduit 212 of valve body 210 may be positioned (e.g., directly) below mixed water conduit 216 of valve body 210 within casing 102 of water heater appliance 100. For example, heated water conduit 212 and mixed water conduit 216 of valve body 210 may be positioned coaxially with each other, and heated water conduit 212 and mixed water conduit 216 of valve body 210 may both extend vertically within casing 102 of water heater appliance 100. In addition, cold water conduit 214 of valve body 210 may be oriented such that cold water conduit 214 extends orthogonal to heated water conduit 212 and mixed water conduit 216 of valve body 210. Such arrangement of heated water conduit 212, cold water conduit 214 and mixed water conduit 216 of valve body 210 may assist with preserving valuable volume within casing 102 of water heater appliance 100.

Optionally, valve body 210 may be formed such that heated water conduit 212, cold water conduit 214 and mixed water conduit 216 of valve body 210 are integrally formed with one another. Thus, for example, valve body 210 may be cast from a suitable metal, such as steel, aluminum, bronze, etc. Valve body 210 may also be formed of any other suitable rigid or ductile material, such as a plastic, a composite, etc., that is suitable for shipping and installing water heater appliance 100 without fracturing valve body 210.

Figure 5:
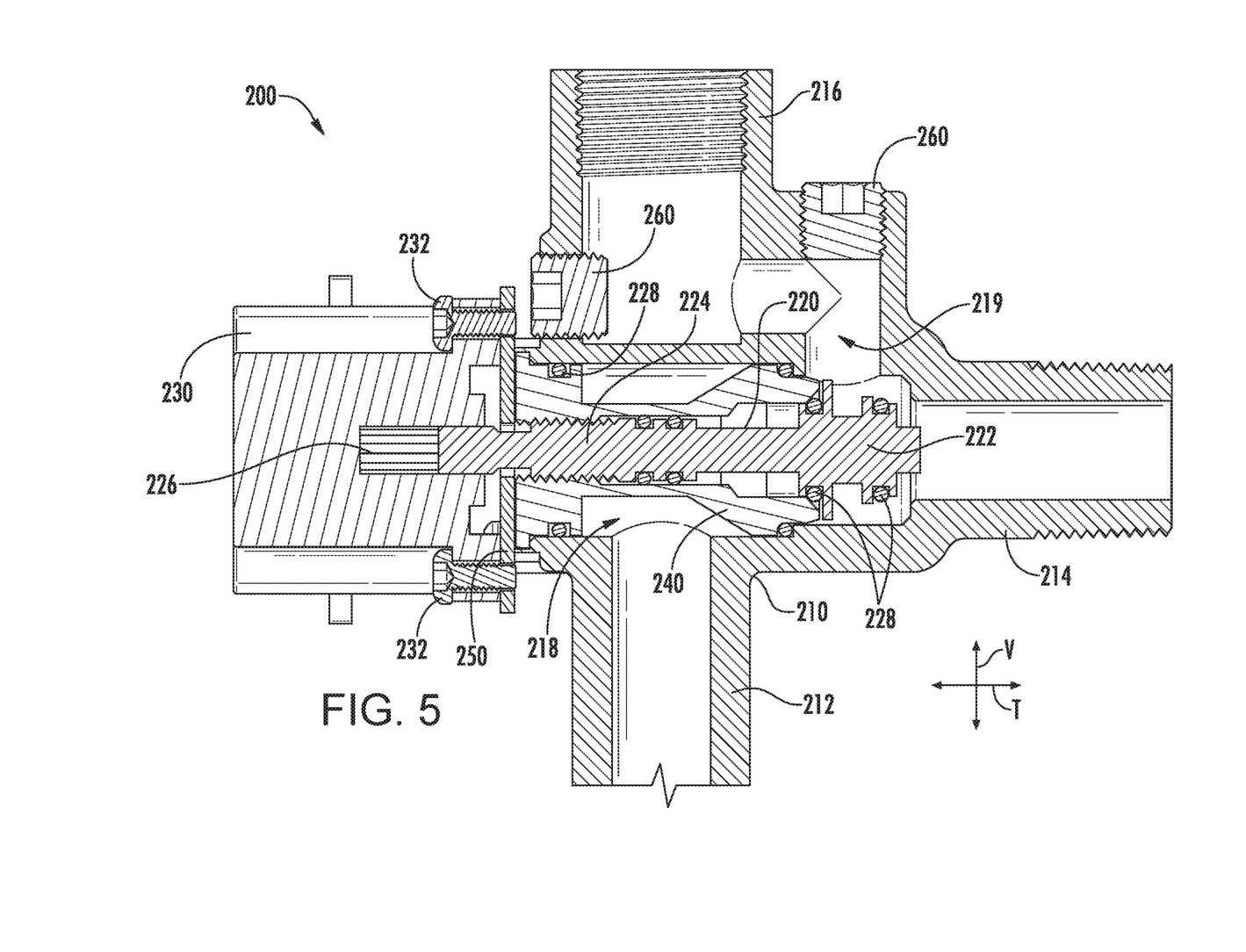
FIG. 5 provides a partial, section view of the mixing valve of FIG. 4 with a plunger of the mixing valve in a fully open position.

As may be seen in FIG. 5, valve body 210 may define a supply conduit 219 that extends between mixing chamber 218 and mixed water conduit 216 of valve body 210. Thus, supply conduit 219 of valve body 210 directs water from mixing chamber 218 to mixed water conduit 216 of valve body 210. Supply conduit 219 of valve body 210 may formed such that supply conduit 219 turns or redirects water within valve body 210 (e.g., by about ninety degrees between mixing chamber 218 and mixed water conduit 216 of valve body 210). As used herein with regards to angle approximations, the term "about" means within ten degrees of the stated angle. Supply conduit 219 of valve body 210 may also be integrally formed with mixed water conduit 216 of valve body 210.

In some embodiments, mixing valve 200 includes a plunger 220 and a support bracket 240. Plunger 220 is positioned within valve body 210 at mixing chamber 218 of valve body 210. Plunger 220 has a head 222, which may assist with regulating water flow into mixing chamber 218 of valve body 210. Support bracket 240 may be positioned within valve body 210 at mixing chamber 218 of valve body 210. When assembled, support bracket 240 may engage plunger 220 within valve body 210 (e.g., in order to support plunger 220 within valve body 210). For example, a post 224 of plunger 220 may be threaded to support bracket 240 (e.g., within mixing chamber 218 of valve body 210).

Turning to FIG. 4, mixing valve 200 may include a mounting plate 250 (e.g., coupled to valve body 210). Any suitable method or mechanism may be used to couple mounting plate 250 to valve body 210. For example, plate fasteners 252 may extend through mounting plate 250 into valve body 210 in order to couple mounting plate 250 to valve body 210. Mounting plate 250 contacts support bracket 240 such that mounting plate 250 retains or holds support bracket 240 within mixing chamber 218 of valve body 210.

Mixing valve 200 further includes a motor 230, such as a stepper motor. Thus, mixing valve 200 is generally referred to as an "electronic mixing valve." Motor 230 is coupled to plunger 220, and motor 230 is operable to adjust a position of the head 222 of plunger 220 within valve body 210 (e.g., as directed by controller 150). For example, motor 230 may engage splines 226 formed on an end of plunger 220 opposite the head 222 of plunger 220, and motor 230 may rotate plunger 220 relative to support bracket 240 such that the threaded connection between post 224 of plunger 220 and support bracket 240 moves the head 222 of plunger 220 within mixing chamber 218 of valve body 210.

As may be seen in FIGS. 3 and 4, mixed water conduit 216 of valve body 210 may be oriented such that liquid within mixed water conduit 216 flows along the vertical direction V. Conversely, motor 230 may be configured for moving plunger 220 along a transverse direction T that is, for example, substantially, perpendicular to the vertical direction V. As used herein the phrase "substantially perpendicular" means within ten degrees of perpendicular.

Motor 230 may be positioned on mounting plate 250 (e.g., on a side of valve body 210 positioned opposite cold water conduit 214 of valve body 210). Any suitable method or mechanism may be used to couple motor 230 to mounting plate 250. For example, motor fasteners 232 may extend through motor 230 into mounting bracket 250 in order to couple motor 230 to mounting plate 250. Such arrangement of motor 230 on valve body 210 may assist with accessing motor 230 within casing 102 of water heater appliance 100. For example, a service technician or owner of water heater appliance 100 may remove motor 230 from valve body 210 (e.g., by removing motor fasteners 232) without having to remove valve body 210 from casing 102 of water heater appliance 100 or having to remove mounting plate 250 from valve body 210 and thereby unsealing valve body 210.

As may be seen in FIG. 3, mixing valve 200 may be positioned within casing 102 at or adjacent top portion 108 of water heater appliance 100. In particular, mixing valve 200 may be positioned within casing 102 above tank 112 and, for example, in a vertical plane between evaporator 128 and compressor 122 of sealed system 120. As discussed in greater detail below, mixing valve 200 may be arranged such that mixing valve 200 does not significantly hinder or obstruct operation of sealed system 120. For example, heated water conduit 212 of valve body 210 may be dimensioned such that valve body 210 is positioned at a bottom portion of evaporator 128 and out of the airflow path into evaporator 128 and such that cold water conduit 214 does not impact a drain pan 129 of evaporator 128 below evaporator 128. Additionally or alternatively, cold water conduit 214 may also be oriented such that cold water conduit 214 extends towards inlet conduit 104 within casing 102.

Figure 6:
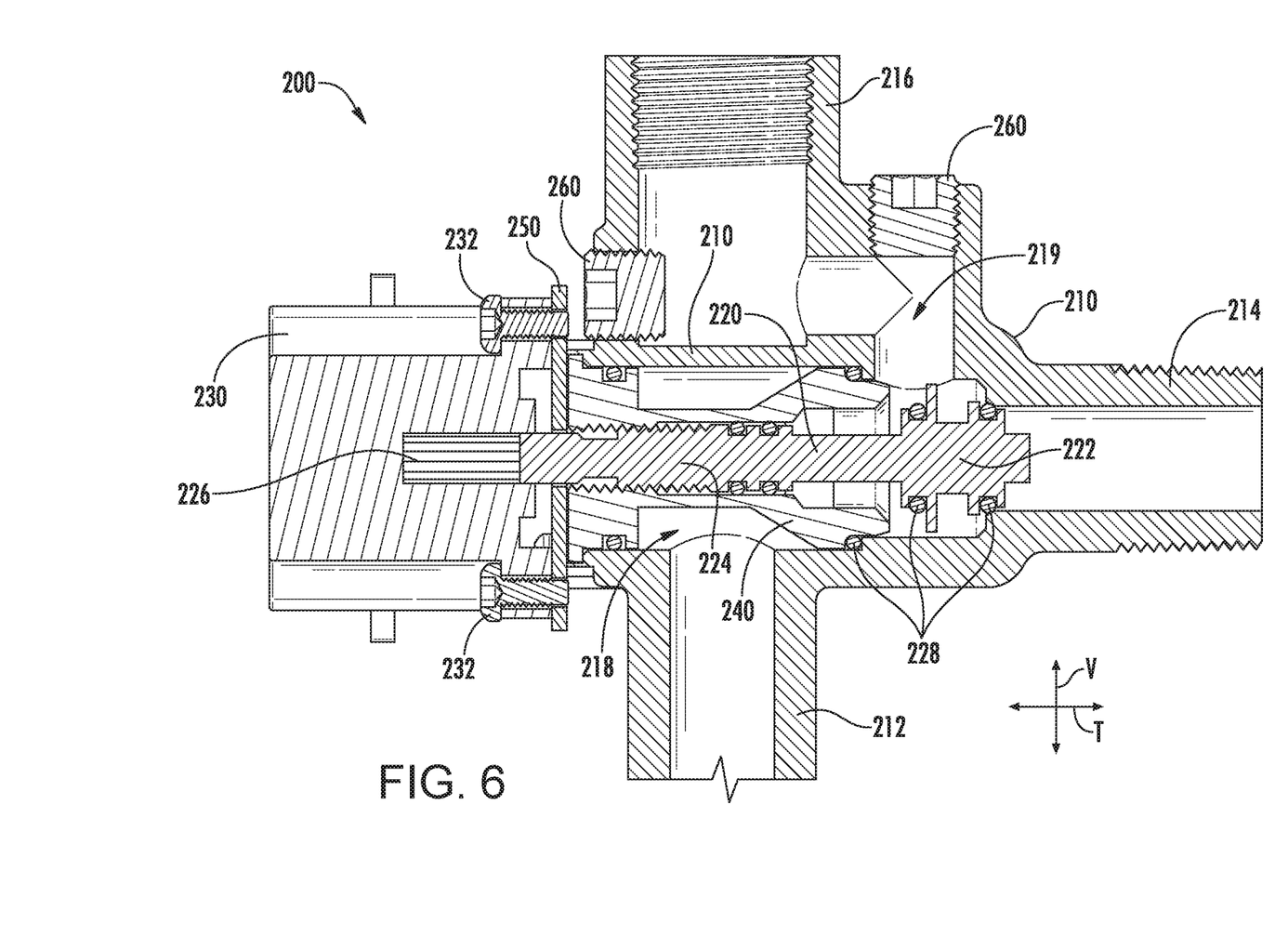
FIG. 6 provides a partial, section view of the mixing valve of FIG. 4 with the plunger of the mixing valve in a fully closed position.

FIG. 5 provides a partial, section view of mixing valve 200 with plunger 220 in a fully open position. FIG. 6 provides a partial, section view of mixing valve 200 with plunger 220 in a fully closed position. As may be seen in FIG. 5, head 222 of plunger 220 is positioned, for example, within mixing chamber 218 of valve body 210, such that head 222 of plunger 220 blocks or significantly limits fluid flow from hot water conduit 212 of valve body 210 into mixing chamber 218 of valve body 210 when plunger 220 is in the fully open position. Thus, all or most of water exiting mixing chamber 218 and flowing to mixed water conduit 216 of valve body 210 is from cold water conduit 214, and water within mixed water conduit 216 of valve body 210 is at or about the temperature of water within cold water conduit 214 when plunger 220 is in the fully open position. Conversely, as may be seen in FIG. 6, head 222 of plunger 220 is positioned (e.g., within mixing chamber 218 of valve body 210) such that head 222 of plunger 220 blocks or significantly limits fluid flow from cold water conduit 214 of valve body 210 into mixing chamber 218 of valve body 210 when plunger 220 is in the fully closed position. Thus, all or most of water exiting mixing chamber 218 and flowing to mixed water conduit 216 of valve body 210 is from hot water conduit 212 and water within mixed water conduit 216 of valve body 210 is at or about the temperature of water within hot water conduit 212 when plunger 220 is in the fully closed position.

During use, motor 230 may adjust plunger 220 between the open and closed positions. In addition, motor 230 may adjust plunger 220 to any suitable position between the open and closed positions. In such a manner, motor 230 may adjust the temperature of water exiting mixing valve 200 at mixed water conduit 216 of valve body 210 to any suitable temperature (e.g., as the set-point temperature of mixing valve 200) between the temperature of water within cold water conduit 214 and the temperature of water within hot water conduit 212.

As may be seen in FIGS. 5 and 6, mixing valve 200 may include various seals 228. Certain seals of seals 228 extend between support bracket 240 and valve body 210 in order to limit leakage of water from mixing chamber 218 of valve body 210. In addition, other seals of seals 228 extend between plunger 220 and valve body 210 in order to assist with limiting leakage of water around the head 222 of plunger 220 (e.g., when plunger 220 is in the open and closed positions). Mixing valve 200 further includes plugs 260 mounted to valve body 210 (e.g., that seal openings used to form or machine supply conduit 219 within valve body 210). Mixing conduit temperature sensor 170 may also be mounted to valve body 210 (e.g., at mixed water conduit 216, as shown in FIG. 4).

Figure 7:
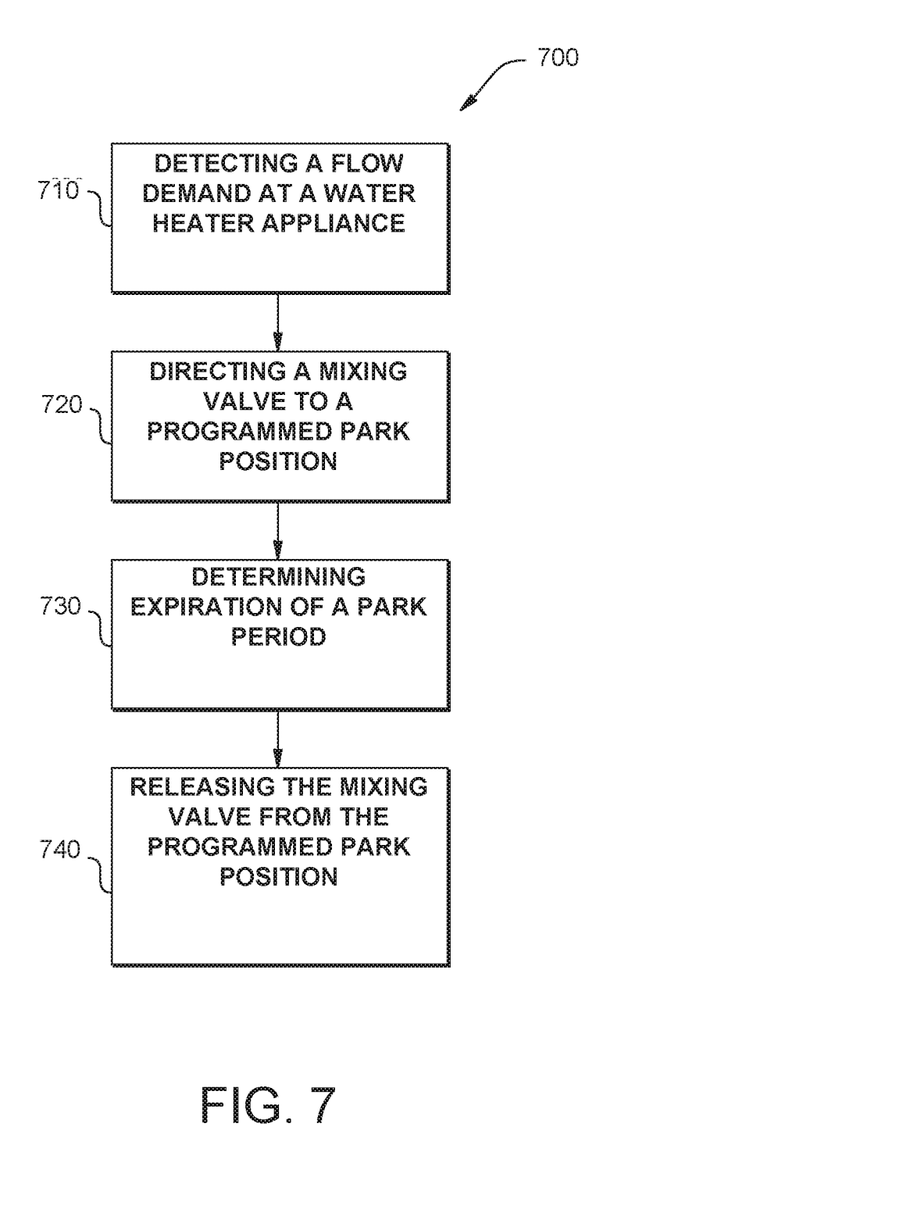
FIG. 7 provides a flow chart illustrating a method of operating a water heater appliance according to exemplary embodiments of the present disclosure.

Turning now to FIG. 7, a flow diagram is provided of a method 700 according to an exemplary embodiment of the present disclosure. Generally, the method 700 provides for controlling and operating a water heater appliance, such as water heater appliance 100 (FIG. 2) (e.g., according to a mixing cycle). For instance, method 700 may provide for directing operations at one or more of upper heating element 118, lower heating element 119, compressor 122, first temperature sensor 170, second temperature sensor 172, flow sensor 173, mixing valve 200 (FIG. 2), as well as any other features of a suitable water appliance. The method 300 may be performed, for instance, by the controller 150. As described above, the controller 150 may be in operative communication with upper heating element 118, lower heating element 119, compressor 122, first temperature sensor 170, second temperature sensor 172, flow sensor 173, or mixing valve 200. Controller 150 may send signals to and receive signals from one or more of upper heating element 118, lower heating element 119, compressor 122, first temperature sensor 170, second temperature sensor 172, flow sensor 173, or mixing valve 200. Controller 150 may further be in communication with other suitable components of the appliance 100 to facilitate operation of the water heater appliance 100 generally.

Advantageously, the present methods may decrease the time required to reach a set-point temperature (e.g., for water dispensed from the water heater appliance, such as from the mixing valve). Additionally or alternatively, the present methods may advantageously prevent extreme variations in temperature for water from the water heater appliance.

Referring to FIG. 7, at 710, the method 700 includes detecting a flow demand at the water heater appliance. In particular, 710 may include measuring an active water flow from the water heater appliance (e.g., downstream from the mixing valve). The active water flow may be measured, for instance, by a flow sensor, as described above. Additionally or alternatively, the active water flow may be measured at the controller absent any dedicated flow sensor, as would be understood. In some embodiments, 710 includes or requires the detected flow demand to follow a stasis period (e.g., in which water within the mixing conduit is generally static or otherwise fails to flow from the mixing valve, such as when no water is being used by a corresponding building or residence). Optionally, the stasis period may include a predetermined stasis time period (e.g., as measured in minutes) in which water is static from an earlier (e.g., first) flow demand. Thus, the flow demand at 710 may be a subsequent or second flow demand. Additionally or alternatively, the stasis period may include a predetermined stasis temperature (e.g., for water within the mixing conduit). Thus, 710 may require expiration of the predetermined stasis time period or for the water temperature at the mixing conduit to fall below the predetermined stasis temperature prior to the flow demand.

At 720, the method 700 includes directing the mixing valve to a programmed park position. Specifically, the mixing valve is directed to the programmed park position (e.g., immediately) in response to detecting the flow demand. Thus, the mixing valve may be moved to the programmed park position once the flow demand starts. Generally, the programmed park position is in between the fully open position (e.g., in which all or most of water exiting the mixing valve and flowing to mixed water conduit is from a cold water conduit) and the fully closed position (e.g., in which all or most of water exiting the mixing valve and flowing to mixed water conduit is from a hot water conduit). Thus, instead of immediately moving the mixing valve, for instance, based on a detected temperature or another measured characteristic, the mixing valve is moved to the programmed park position irrespective of any temperature signals (e.g., detected at that moment). Optionally, the programmed park position may be based, at least in part, on the set-point temperature for the mixing valve.

In some embodiments, the programmed park position is a predetermined default valve position. For instance, the predetermined default valve position may be set during assembly of the water heater appliance (e.g., based on testing data of a representative model at one or more set-point temperatures).

In additional or alternative embodiments, the programmed park position is based on prior-use determination. For instance, prior to 710, another (e.g., first) flow demand may be received. During that first flow demand (e.g., as water is flowing from the water heater appliance), the mixing valve may be selectively adjusted according to a feedback loop, such as a PID control scheme, in order that the water temperature within the mixed conduit valve matches the set-point temperature of the mixing valve. Thus, the first flow demand may be detected and the outlet water temperature downstream from the mixing valve may be measured during the first flow demand. Once the water temperature within the mixed conduit valve matches the set-point temperature of the mixing valve, the position of the mixing valve may be recorded (e.g., as the programmed park position). Thus, the prior-use determination may further include determining the measured outlet water temperature matches a set-point temperature, and recording the valve position of the mixing valve as the programmed park position in response to determining the measured outlet water temperature matches the set-point temperature. In turn, the later second flow demand may prompt the mixing valve to return to the previous valve position, since it has been recorded as the programmed park position.

At 730, the method 700 includes determining expiration of a park period following directing the mixing valve to the programmed park position. Specifically, the park period may begin at 720 and continue while the mixing valve is in the predetermined park period. Thus, 730 may require maintaining the mixing valve in the programmed park position (e.g., continuously or without moving therefrom) for the duration of the park period. In other words, the mixing valve may be held in the programmed park position for at least as long as the park period continues. In some embodiments, the park period is a predetermined time period initiated with 720. As an example, the park period may be a time period less than 10 seconds. As an additional or alternative example, the park period may be a time period greater than 2 seconds. As another additional or alternative example, the park period may be between 2 seconds and 10 seconds (e.g., 5 seconds).

At 740, the method 700 includes releasing the mixing valve from the programmed park position in response to determining expiration of the park period. Specifically, the mixing valve may be permitted based on a temperature-responsive scheme or feedback after the mixing valve is released from the programmed park position. Thus, only after the park period has ended, the mixing valve may be adjusted or directed based on the temperature detected from one or more temperature sensors, as described above. In some embodiments, 740 includes directing the mixing valve based on a temperature-dependent feedback loop, such as a PID control scheme, following releasing the mixing valve from the programmed park position as water continues to flow from the water heater appliance. For instance, the feedback loop may continue for the remaining duration of the (e.g., second) flow demand.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a water heater appliance, the method comprising:
   detecting expiration of a predetermined stasis period;
   detecting a flow demand at the water heater appliance following expiration of the predetermined stasis period;
   directing a mixing valve to a programmed park position in response to detecting the flow demand;
   determining expiration of a park period following directing the mixing valve to the programmed park position; and
   releasing the mixing valve from the programmed park position in response to determining expiration of the park period.

2. The method of claim 1, wherein the programmed park position is a predetermined default valve position.

3. The method of claim 1, wherein the programmed park position is based on a prior-use determination.

4. The method of claim 3, wherein the flow demand is a second flow demand, wherein the prior-use determination comprises
   detecting, prior to detecting the second flow demand, a first flow demand,
   measuring an outlet water temperature downstream from the mixing valve during the first flow demand,
   determining the measured outlet water temperature matches a set-point temperature, and
   recording a valve position of the mixing valve as the programmed park position in response to determining the measured outlet water temperature matches the set-point temperature.

5. The method of claim 1, wherein the park period is a predetermined time period initiated with directing the mixing valve to the programmed park position.

6. The method of claim 5, wherein the predetermined time period is less than 10 seconds.

7. The method of claim 5, wherein the predetermined time period is greater than 2 seconds.

8. The method of claim 5, wherein the predetermined time period is 5 seconds.

9. The method of claim 1, directing the mixing valve based on a temperature-dependent feedback loop following releasing the mixing valve from the programmed park position.

10. A water heater appliance comprising
    a casing:
    a tank disposed within the casing, the tank defining an inlet and an outlet;
    an inlet conduit mounted to the tank at the inlet of the tank;
    an electric heating system in thermal communication with the tank to heat water within the tank;
    a mixing valve mounted to the casing downstream from the tank; and
    a controller operably coupled to the electric heating system and the mixing valve, the controller being configured to initiate a mixing cycle, the mixing cycle comprising detecting expiration of a predetermined stasis period, detecting a flow demand at the water heater appliance following expiration of the predetermined stasis period, directing the mixing valve to a programmed park position in response to detecting the flow demand, determining expiration of a park period following directing the mixing valve to the programmed park position, and releasing the mixing valve from the programmed park position in response to determining expiration of the park period.

11. The water heater appliance of claim 10, wherein the programmed park position is a predetermined default valve position.

12. The water heater appliance of claim 10, wherein the programmed park position is based on a prior-use determination.

13. The water heater appliance of claim 12, wherein the flow demand is a second flow demand, wherein the prior-use determination comprises detecting, prior to detecting the second flow demand, a first flow demand, measuring an outlet water temperature downstream from the mixing valve during the first flow demand, determining the measured outlet water temperature matches a set-point temperature, and recording a valve position of the mixing valve as the programmed park position in response to determining the measured outlet water temperature matches the set-point temperature.

14. The water heater appliance of claim 10, wherein the park period is a predetermined time period initiated with directing the mixing valve to the programmed park position.

15. The water heater appliance of claim 14, wherein the predetermined time period is less than 10 seconds.

16. The water heater appliance of claim 14, wherein the predetermined time period is greater than 2 seconds.

17. The water heater appliance of claim 14, wherein the predetermined time period is 5 seconds.

18. The water heater appliance of claim 10, directing the mixing valve based on a temperature-dependent feedback loop following releasing the mixing valve from the programmed park position.

19. A water heater appliance comprising a casing:

a tank disposed within the casing, the tank defining an inlet and an outlet;

an inlet conduit mounted to the tank at the inlet of the tank;

an electric heating system in thermal communication with the tank to heat water within the tank;

a mixing valve mounted to the casing downstream from the tank the mixing valve comprising a valve body, the valve body comprising a mixed water conduit;

a mixing conduit temperature sensor mounted to the valve body at the mixed water conduit; and a controller operably coupled to the electric heating system and the mixing valve, the controller being configured to initiate a mixing cycle, the mixing cycle comprising detecting expiration of a predetermined stasis time period, detecting a flow demand at the water heater appliance following expiration of the predetermined stasis time period, directing the mixing valve to a programmed park position in response to detecting the flow demand, determining expiration of a park period following directing the mixing valve to the programmed park position, releasing the mixing valve from the programmed park position in response to determining expiration of the park period, and directing the mixing valve based on a temperature-dependent feedback loop following releasing the mixing valve from the programmed park position, wherein the park period is a predetermined time period initiated with directing the mixing valve to the programmed park position.

20. The water heater appliance of claim 19, wherein the park period is less than 10 seconds.

* * * * *